(12) United States Patent
Drueppel et al.

(10) Patent No.: US 12,163,636 B2
(45) Date of Patent: Dec. 10, 2024

(54) LIGHTING DEVICE FOR A MOTOR VEHICLE

(71) Applicant: HELLA GmbH & Co. KGaA, Lippstadt (DE)

(72) Inventors: Mathias Drueppel, Lippstadt (DE); Carsten Hohmann, Warstein (DE); Marc Kaup, Paderborn (DE); Alfons Michaelis, Borchen (DE); Martin Muegge, Geseke (DE); Diana Mundt, Lippstadt (DE); Thomas Rettweiler, Lippstadt (DE); Jacek Roslak, Paderborn (DE); Christian Schmidt, Paderborn (DE); Dietmar Schroeder, Paderborn (DE); Martin Vollmer, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/380,169

(22) Filed: Oct. 14, 2023

(65) Prior Publication Data
US 2024/0125444 A1    Apr. 18, 2024

(30) Foreign Application Priority Data

Oct. 14, 2022   (DE) .......................... 102022126896.9

(51) Int. Cl.
*F21S 41/143*   (2018.01)
*F21S 41/20*    (2018.01)
*F21S 41/32*    (2018.01)

(52) U.S. Cl.
CPC .......... *F21S 41/143* (2018.01); *F21S 41/285* (2018.01); *F21S 41/32* (2018.01)

(58) Field of Classification Search
CPC ........ F21S 41/143; F21S 41/32; F21S 41/285; F21S 41/13
See application file for complete search history.

(56) References Cited

U.S. PATENT DOCUMENTS

| 5,490,049 A | * | 2/1996 | Montalan | H05B 45/40 362/240 |
| 5,819,454 A | * | 10/1998 | Rosenitsch | G09F 9/33 362/240 |
| 2018/0312102 A1 | * | 11/2018 | Park | F21S 43/50 |

FOREIGN PATENT DOCUMENTS

DE         102016119326 A1    4/2018

* cited by examiner

*Primary Examiner* — Matthew J. Peerce
(74) *Attorney, Agent, or Firm* — Muncy, Geissler, Olds & Lowe, P.C.

(57) ABSTRACT

A lighting device for a motor vehicle, wherein the lighting device has a circuit board with a multiplicity of light-emitting diodes arranged thereon, a transparent optical layer, and a reflector element, wherein the reflector element is arranged between the circuit board and the optical layer, wherein the reflector element has multiple segments into which the reflector element is subdivided, wherein a segment is associated with each light-emitting diode so that light emitted by the light-emitting diodes can be reflected by the reflector element and can pass through the optical layer. Two light-emitting diodes are arranged in a segment. In addition, a lighting system and a motor vehicle are provided.

15 Claims, 15 Drawing Sheets

LIGHTING DEVICE FOR A MOTOR VEHICLE

This nonprovisional application claims priority under 35 U.S.C. § 119(a) to German Patent Application No. 10 2022 126 896.9, which was filed in Germany on Oct. 14, 2022, and which is herein incorporated by reference.

BACKGROUND OF THE INVENTION

Field of the Invention

The invention relates to a lighting device for a motor vehicle, a lighting system, as well as a motor vehicle.

Description of the Background Art

The implementation of a pixelated or segmented functional surface of a lamp or lighting apparatus on a motor vehicle serves to define and provide a desired illuminated signature or to display additional information content (such as numbers, text, pictograms) through different, individual switching of individual segments/pixels. As a result, new content or light signatures can be developed and offered to the vehicle owner/driver over its service life on the motor vehicle without the need to develop a new lamp each time.

A lighting device is known from DE 10 2016 119 326 A1, which, is incorporated herein by reference.

From the general prior art, displays with light-emitting diodes are known, which are also referred to as "LED displays" or "LED panels." The LED displays have a matrix arrangement of RGB LEDs, which are known most notably from advertising or as video walls at trade fairs and concerts. RGB LEDs have very low light output, which is why the legally required light intensity in the automotive field cannot be achieved with these LED displays with a suitably limited number of LEDs. Moreover, such LED displays are usually driven by means of video interfaces, such as, e.g., HDMI, which are not used in motor vehicles, especially since such video signals are unsuited or are only poorly suited for driving lamps and functions. The pixelated arrangement of light-emitting diodes in a matrix is also a disadvantage of these LED displays. The viewer sees a bright point at each LED location, and it is only due to the very small separations and a correspondingly high resolution that a sharp image is even discernible for an observer at short viewing distances. This is why spacings between adjacent light-emitting diodes in such LED panels of less than 2 mm are already provided at the present time, and spacings of 1 mm or less are sought.

In order to produce the legally required minimum light intensities in automotive use of 4 cd for a red rear light, of 50 cd (ECE) or 130 cd (SAE) for a yellow directional indicator, and of 60 cd (ECE) or 80 cd (SAE) for a red brake light, as well as 400 cd (ECE) or 500 cd (SAE) for a white daytime running light, it is necessary to use light-emitting diodes with relatively high operating currents and light outputs as well as an automotive specification, and also optical systems that optimally use the light output of the light-emitting diodes so that a brake light or a directional indicator can be generated even with a small number of pixels/segments, and different light signatures can accordingly be developed and approved with the segmented matrix display area that is present.

SUMMARY OF THE INVENTION

It is therefore an object of the invention to provide a lighting device that is improved over the prior art and that preferably has especially great freedom in designing the display of light signatures. It is further preferred that the lighting device has a cost-effective and compact construction.

The above object is attained by a lighting device, a lighting system, and a motor vehicle. Of course, features and details that are described in connection with the lighting device according to the invention also apply in connection with the lighting system according to the invention as well as the motor vehicle according to the invention and vice versa in each case, so mutual reference is or can always be made with regard to the disclosure of the individual aspects of the invention.

According to a first aspect of the invention, the aforementioned object is attained by a lighting device for a motor vehicle, wherein the lighting device is designed especially for light signature displays or for displaying light signatures. The lighting device has a circuit board with a multiplicity of light-emitting diodes for emitting light arranged thereon, an optical layer, and a reflector element. The reflector element is arranged between the circuit board and the optical layer. The reflector element has multiple segments into which the reflector element is subdivided, wherein a segment is associated with each light-emitting diode, so that light emitted by the light-emitting diodes can be reflected, and preferably limited, at the segments of the reflector element and can pass through the optical layer. According to the invention, at least two light-emitting diodes are arranged in a segment.

The circuit board can have a multiplicity of conductive traces by means of which the light-emitting diodes can be electrically coupled to a control unit for controlling the lighting device. The light-emitting diodes are preferably designed as direct-radiating light-emitting diodes. Preferably, the light-emitting diodes are attached to the circuit board, for example via solder joints for electrical coupling to the conductive traces.

The reflector element is designed to reflect, and preferably limit, the light emitted by the light-emitting diodes. For this purpose, the reflector element is divided into multiple segments, wherein according to the invention at least two light-emitting diodes are arranged in a segment. According to the invention, more than two light-emitting diodes can also be arranged in a segment. For example, the light-emitting diodes can be designed as micro-LEDs. The two light-emitting diodes preferably are arranged closely adjacent to one another, for example in direct contact. This has the advantage that the two or more light-emitting diodes can more easily be perceived as a common light source and the demands on the optical layer for this purpose are lower. It is furthermore preferred for two light-emitting diodes to be arranged in multiple segments. Provision can be made within the scope of the invention that only one light-emitting diode is arranged in one or more segments. Alternatively or in addition, provision can be made according to the invention that three or more light-emitting diodes are arranged in one or more segments.

According to the invention, multiple segments at a time can combined into an arrangement that repeats by row and column on the reflector element. The thus repeating arrangements of the segments with their respective shape permit an especially versatile design and display of different light signatures. In particular, the arrangements can have a shape corresponding with the segments or to the segments, which means, in particular, that multiple segments can be combined into a new shape in each case that most particularly differs from the shape of the segments. For example, the arrangements can each have a rectangular shape or honeycomb shape. Very particularly, the arrangements can be rectangular, in particular square, with a triangular shape of the segments, and honeycomb-shaped with a hexagonal shape of the segments. For example, four triangular segments can be combined into a rectangular shape. Accordingly, the light-emitting diodes can also be arranged correspondingly thereto on the circuit board. Thus the circuit board can have a repeating pattern of an arrangement of eight light-emitting diodes each. The arrangement can be described, for example, as an O-arrangement, in which four light-emitting diodes can be connected to one another by an imaginary circle.

The light-emitting diodes arranged in a segment can have the same color, for example. Preferably, the light-emitting diodes arranged in a segment are designed to be individually switchable. The use of multiple light-emitting diodes in a segment has the advantage that a higher luminous power can be provided so that the lighting device according to the invention has a greater light intensity per segment as compared to conventional lighting devices and thus also over the entire emitting area of the lighting device.

The lighting device can have the optical layer for transmission of the light emitted by the light-emitting diodes and of the light from the light-emitting diodes that is reflected by the reflector element. The optical layer is preferably designed to achieve an optical effect, such as, e.g., a focusing of the light and/or diffusion and homogenization of the light and/or deflection of the light or the like. Provision can be made, for example, that the optical layer has optical diffusion elements on its front side and/or rear side. Pillow optics or microoptics or a diffractive diffuser structure or microstructure or, in the simplest case, an eroded structure or etched structure, can be provided as optical diffusion elements, for example.

Preferably, the optical layer can be designed as an optically segmented optical layer, wherein the segmentation preferably is matched to the segments of the reflector element. Further preferably, the segmentation is matched to the position of the light-emitting diodes relative to the optical layer. Especially preferably, the optical layer is designed to achieve as uniform a light emission distribution for a segment as possible, so that the segment can be perceived by a viewer as a homogeneous light source. Accordingly, the optical layer preferably is designed such that the viewer of the segment cannot distinguish how many light-emitting diodes emitting light are arranged in the segment. Especially preferably, the optical layer has such a design for a multiplicity of the segments or for all segments. The optical layer can additionally have a coloration in order to produce a lower transmittance or to provide a defined color impression, on the one hand. In addition, the optical layer can have a coating on the front side, for example a sputtering, to produce a mirror effect with the remaining transmission for the lighting device.

It is also possible that the segments have strip optics or that strip optics are formed in the segments. In this case, a strip optic can be provided at each surface or reflector wall of the segment or of the reflector element. The strip optics, which can also be referred to as ribbed optics, can disperse the direct surface reflection of the light from the light-emitting diodes and thus counteract a concentrated projection of the light in the lighting in order to avoid hot spots.

The phrase "the lighting device is designed for a motor vehicle" may mean that the lighting device is suitable for use in a motor vehicle. Nevertheless, other application areas are also conceivable and possible for the lighting device according to the invention. The field of application of the motor vehicle is especially preferred. Thus, the lighting device can be, most especially, a motor vehicle lighting device. For example, the lighting device can be designed as a tail light, an auxiliary light, a front lamp, a headlight, or the like.

At least two light-emitting diodes can be arranged in the multiplicity of the segments or in all the segments of the reflector element. In this case, provision can be made according to the invention that more than two light-emitting diodes, such as for example three light-emitting diodes, are arranged in the multiplicity of the segments or in all the segments of the reflector element. It is especially preferred according to the invention that at least two light-emitting diodes can be arranged in all segments of the reflector element. Consequently, an especially uniform as well as high light intensity can be achieved over the entire emitting area of the lighting device.

Preferably, the light-emitting diodes that are arranged in a segment can have different colors. This is understood within the scope of the invention to mean that the light-emitting diodes are designed to emit light with wavelengths that differ from one another. A first light-emitting diode can be designed, for example, to emit light with a first wavelength, and a second light-emitting diode can be designed, for example, to emit light with a second wavelength that is different from the first wavelength. Light emission colors of the individual segments can therefore be selectively influenced by means of the individual switchability of the light-emitting diodes in a segment. Provision can be made according to the invention that one or both light-emitting diodes are designed as multicolor light-emitting diodes. A multicolor light-emitting diode is understood within the scope of the invention to mean a light-emitting diode that is designed to emit light over a spectrum of different wavelengths. With a multicolor light-emitting diode, therefore, light can be emitted selectively in different colors in alternation. Preferably, one light-emitting diode in a segment is designed as a multicolor light-emitting diode and the other light-emitting diode as a white light-emitting diode. Provision can be made according to the invention that, when there are three light-emitting diodes in the segment, the three light-emitting diodes have different colors.

Further preferably, the optical layer can have a diffuser film or a diffuser plate. Preferably, the optical layer is designed as a diffuser film or diffuser plate. A diffuser film is understood to be a layer that can be spread in front of the reflector element, for example on the reflector element, on a housing of the lighting device, on an auxiliary frame, or the like. It is preferred in this context for the diffuser film to have relatively great flexibility or elasticity. Preferably, the diffuser film has a diffuser structure and/or microoptics or the like. In comparison with conventional optical plates, which usually have wall thicknesses of over 2 mm, the diffuser film has a substantially smaller wall thickness, preferably less than 1.2 mm, in particular less than 0.5 mm. Light guiding effects, which are especially strongly pronounced inside a relatively thick optical plate and degrade the contrast from illuminated segments to adjacent unilluminated segments, can be significantly reduced or largely avoided by means of the diffuser film. Consequently, a better contrast ratio is achievable with the diffuser film and thus an improved, sharper display can be provided for a viewer of the lighting device.

Preferably, the optical layer can have multiple stacked diffuser films or diffuser plates. The diffuser films or diffuser plates preferably have mutually complementary diffuser structures and/or microoptics or the like. In this context, two stacked diffuser films are preferred. Alternatively, three or more stacked diffuser films or diffuser plates can also be provided in accordance with the invention. Preferably, the stacked diffuser films or diffuser plates have different wall thicknesses. A bottom, first diffuser film, designed as, for example, a carrier film, can have, for example in order to provide basic stability, a greater wall thickness than a second diffuser film arranged thereon. Alternatively or in addition, the diffuser films or diffuser plates can also have different materials and/or textures or the like. As a result, a total wall thickness of the optical layer can advantageously be reduced while ensuring sufficient strength.

The optical layer can have a wall thickness between 0.2 mm and 1.2 mm. Especially preferably, the optical layer has a wall thickness between 0.2 mm and 0.5 mm. In the case of two stacked diffuser films, a first diffuser film preferably has a wall thickness between 0.1 mm and 0.5 mm and a second diffuser film has a wall thickness between 0.1 mm and 0.2 mm. Light guiding effects can be further reduced by such small wall thicknesses. In this way, an improved contrast ratio is achievable and thus an improved, sharper display can be provided for a viewer of the lighting device.

As an alternative to diffuser films, it is also possible to use thin-walled, injection-molded optical plates with wall thicknesses between 0.5 mm and 1.2 mm.

Provision can be made according to the invention that the lighting device has a grid mask that delimits the segments from one another. The grid mask preferably has multiple grid elements, such as for example grid bars, arranged to form a structure. The grid elements preferably are designed to be opaque. The grid elements can be black, for example. Owing to the grid elements of the grid mask, the result can be achieved that the segments in the cold and warm appearance of the lighting device can be better demarcated from one another in order to improve the visual perception of the light signatures that can be displayed. The optical layer preferably is arranged between the reflector element and the grid mask. The grid structure of the grid mask preferably corresponds to the segmentation of the reflector element or is at least matched to the segmentation of the reflector element, for example through an integer scaling factor, so that, for example, multiple, preferably full, segments of the reflector element can be associated with one grid segment of the grid mask or multiple, preferably full, grid segments of the grid mask can be associated with one segment of the reflector element.

The grid mask can be designed as a sheet-metal panel, a film, and/or an injection-molded part. A thin sheet metal panel, for example with a wall thickness between 0.1 mm and 0.5 mm, can in particular be used as a sheet-metal panel, which can be laser-cut or EDM wire eroded to produce the openings in the region of the segments. The sheet metal panel can then be clamped between the optical layer and a housing frame or housing of the lighting device during assembly or can be glued or screwed into the housing frame. The film can be printed or bonded, for example. The film or adhesive film can be printed with the grid or the grid bars and be clamped between the optical layer and the housing frame during assembly. Preferably, the film is adhered to the optical layer. A two-component injection-molded part, in particular, can be used as an injection-molded part. The grid mask can be injection-molded onto the optical layer in this case, for example as a second, black component.

The lighting device can have a housing. The housing can have a housing frame. According to the invention, the housing frame can be designed as one part or as multiple parts, in particular as two parts. The circuit board, the reflector element, the light-emitting diodes, and the optical layer can be accommodated in the housing. Furthermore, the grid mask can also be accommodated in the housing. Fastening elements, such as, e.g., screw bosses, can be arranged on the back of the housing.

Moreover, provision can be made that a spacing between the light-emitting diodes and the optical layer is less than 15 mm, very preferably less than 12 mm, further very preferably less than 10 mm, and especially preferably less than 8 mm. As a lower limit, the spacing can be, for example, at least 2 mm, very particularly at least 4 mm, and further very particularly at least 6 mm. Accordingly, an especially compact lighting system is provided that very particularly has a small thickness.

The segments can have a triangular, rectangular, pentagonal, hexagonal, or another polygonal shape. The shape refers in particular to the cross-section of the segment, or the shape is visible in the top view of the segment at the reflector element. Accordingly, regions at the optical plate can be illuminated that assume a corresponding shape of the segments, which is to say a triangular luminous shape, a rectangular luminous shape, a pentagonal luminous shape, or a hexagonal luminous shape. As a result, different light signatures can be displayed by the lighting device through the illumination of multiple segments. Especially great freedom in driving for different light signatures is made possible in the case of triangular segments, in particular.

In the case of a triangular-shaped segment, for example, each segment has, in particular, three reflector areas or reflector walls, which are connected to one another at their sides. The segments can each have two openings in their centers. One opening is close to the light-emitting diode associated with the segment in order to allow the light from the light-emitting diode to radiate in. The other opening is close to the optical plate or far from the light-emitting diode in order to allow the light reflected at the reflector areas of the segments of the reflector element to radiate out toward the optical plate. In this case, the opening near the light-emitting diode is, in particular, smaller than the opening that is close to the optical plate. Accordingly, segments can be provided that, in particular, narrow or converge in the direction from the optical plate to the light-emitting diodes. The segments can therefore be described with regard to their body or volume as funnel-shaped or pyramidal with suitable openings at the top and bottom of the pyramidal shape.

When the segments are triangular in design, for example, each segment has, in particular, three reflector areas or reflector walls, which are connected to one another at their sides. In the case of a different shape, a correspondingly larger number of reflector areas can form the segment. The segments can each have two openings in their centers. One opening is close to the light-emitting diode associated with the segment in order to allow the light from the light-emitting diode to radiate in. The other opening is close to the optical plate or far from the light-emitting diode in order to allow the light reflected at the reflector areas of the segments of the reflector element to radiate out toward the optical plate. In this case, the opening near the light-emitting diode is, in particular, smaller than the opening that is close to the optical plate. Accordingly, segments can be provided that, in particular, narrow or converge in the direction from the optical plate to the light-emitting diodes. The segments can therefore also be described with regard to their body or volume as funnel-shaped or pyramidal with suitable openings at the top and bottom of the pyramidal shape.

According to a second aspect of the invention, the aforementioned object is attained by a lighting system for a motor vehicle having one or more lighting devices according to the first aspect of the invention and a control unit for controlling a light signature display of the one or more lighting devices.

By means of the control unit or an electronic system of the control unit, the lighting device preferably may be variably drivable to represent a wide variety of different content. Preferably, the control unit is designed to selectively drive the lighting devices separately from one another or individually. Especially preferably, the control unit is designed to selectively drive the individual light-emitting diodes of the lighting devices. The control unit can be equipped in this case to control at least two of the multiple lighting devices to display a shared light signature.

Content can be understood within the scope of the invention to mean, for example, linear or strip-like or planar illuminated areas in the lighting device, wherein the linear or strip-like light signatures can also form curves with one or more changes in direction (bends) in order to provide a legally prescribed signaling function, for example a daytime running light, a directional indicator, a brake light, or a rear light or position light. Content can be further understood to mean individual pictograms and symbols, such as for example traffic signs or auxiliary signs in traffic, such as a right arrow, an indicator arrow, a representation of a passenger, or warnings, for example for hazard braking, for creating an emergency corridor, or in the case of a breakdown or the like. Such content, which can be represented by means of suitable illumination of several of the light-emitting diodes or segments, is understood within the scope of the invention as light signatures. Such light signatures can be designed as static or dynamic light signatures. Static light signatures are understood to be light signatures that do not change with the passage of time. Dynamic light signatures are understood to be light signatures that change with the passage of time.

In this context, a shared light signature is understood in the present case to mean that the light signatures of the at least two lighting devices are coordinated with one another in order to show the same or coordinated content by means of the light-emitting diodes of the lighting device.

The light-emitting diodes arranged in a segment of the lighting device can have different emission colors, wherein the lighting system is designed to provide multiple different light signals. An ability to represent luminous signals can be improved through the different emission colors, such as for example red, green, yellow, blue, white, or the like. Consequently, a multitude of different colors can be achieved in the individual segments through the selective drivability of the light-emitting diodes.

According to a third aspect of the invention, the aforementioned object is attained by a motor vehicle having a lighting system according to the first aspect of the invention or a lighting system according to the second aspect of the invention.

Preferably, the lighting devices are arranged along a contour of curvature of the motor vehicle, wherein the individual lighting devices have different mounting angles, each of which is matched to a position of the relevant lighting device along the contour of curvature.

The modular construction of the overall lighting device advantageously permits an adaptation of the individual modules to the curvature of the vehicle front or vehicle rear, so that a direct lining up to form a curved lighting device is provided with suitable matching of the individual modules with regard to size, wherein the total number of individual modules can be integrated and held in a common housing. Moreover, the modular construction is advantageous in the event of damage, e.g., after accident damage on one side or in the event of failure of one or more LEDs on a circuit board, because only the modules or components, for example circuit boards, that are actually damaged need to be exchanged and replaced for the purpose of repair. This is advantageous from economic and insurance standpoints, in particular, as well as for recycling concepts in terms of sustainability and resource conservation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Elements that are identical or of the same type are provided with the same reference symbols in FIGS. 1 to 15. For purposes of clarity, elements that are identical or of the same type are not all provided with a reference symbol throughout.

FIGS. 1 to 5 each show a lighting device 1 according to an exemplary embodiment of the invention in a top view, a perspective view, and a side view.

The lighting device 1 includes a housing 4, which in the present case is designed as a housing frame with a first housing part 2 and a second housing part 3. The housing 4 has a relatively small thickness relative to its width and height. In other words, the housing 4 is plate-like or flat in design. By way of example, in the present case the housing 4 is rectangular, in particular square, particularly in the first housing part 2, so that the lighting device 1 as a whole has a rectangular shape. Alternatively, however, the housing 4 or the lighting device 1 can have other shapes, such as rectangular, round, or oval.

Figure 1:
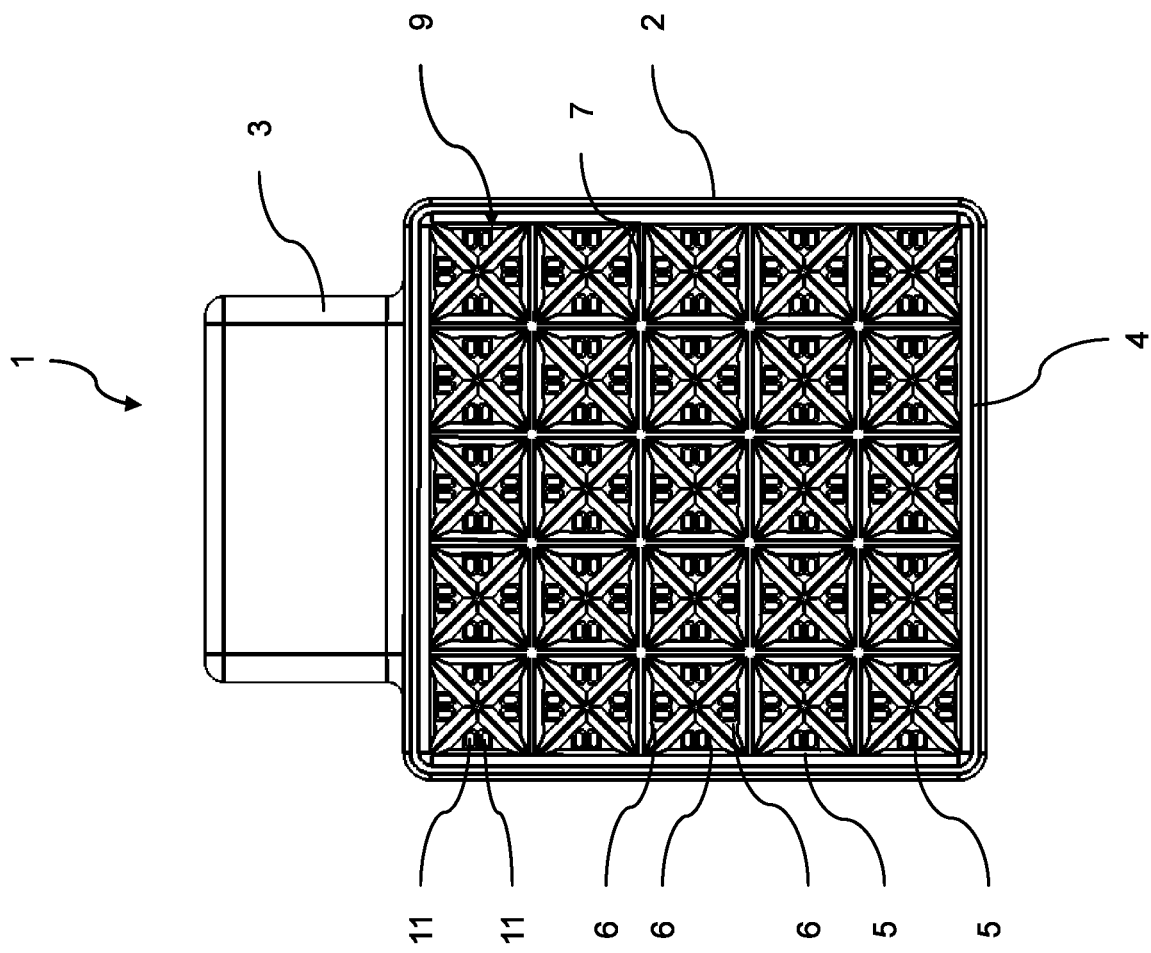
FIG. 1 shows a top view of a lighting device according to a preferred exemplary embodiment of the invention.
Figure 2:
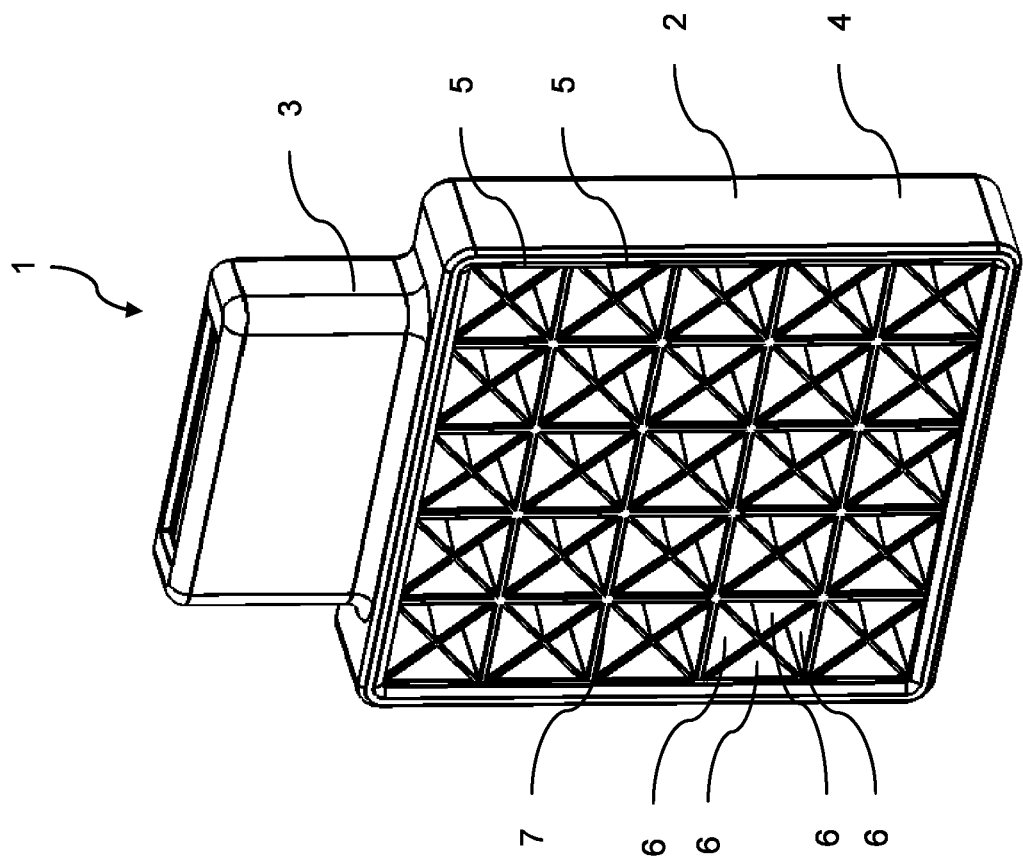
FIG. 2 shows an oblique view of the lighting device from FIG. 1.

As is evident from FIG. 1, the lighting device 1 has a reflector element 9 made from several arrangements 5, each of which includes a multiplicity of segments 6. In the present case, the arrangements 5 are square in their basic shape or appearance in the lighting device 1, and each include four segments 6, which in each case have a base shape of an equilateral triangle and completely fill the arrangement 5.

The individual segments 6 can be illuminated individually and uniformly by means of light-emitting diodes 11 arranged behind them. To this end, two light-emitting diodes 11, which preferably are separately drivable and further preferably have different colors or are designed to emit different light waves, are arranged in each segment 6. A grid mask 7 is arranged in front of the reflector element 9. The grid mask 7 is designed to be flush with segment walls of the segments 6 so that the segment walls are covered by the grid mask 7 and interiors of the segments 6 are left exposed.

Figure 3:
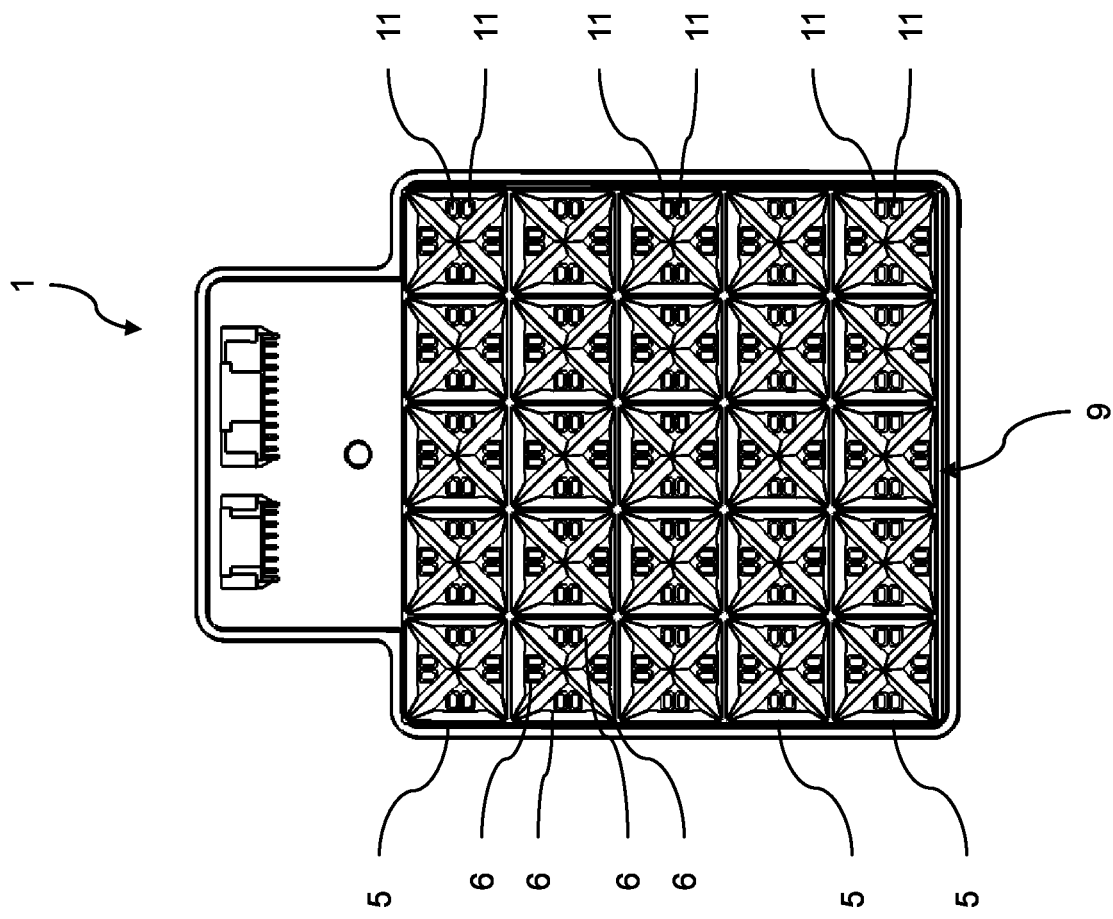
FIG. 3 shows a top view of the lighting device from FIG. 1 without housing and without grid mask.

FIG. 3 shows a top view of the lighting device 1 from FIG. 1 without housing 4 and without grid mask 7. Visible here is the reflector element 9, which is subdivided into multiple square arrangements 5, each composed of four segments 6. Two light-emitting diodes 11 are arranged directly adjacent to one another in each of the segments 6. The light-emitting diodes 11 are designed to illuminate the relevant segment 6. Segment walls of the segments 6 are designed to reflect the light emitted by the light-emitting diodes 11 within the relevant segment 6.

Figure 4:
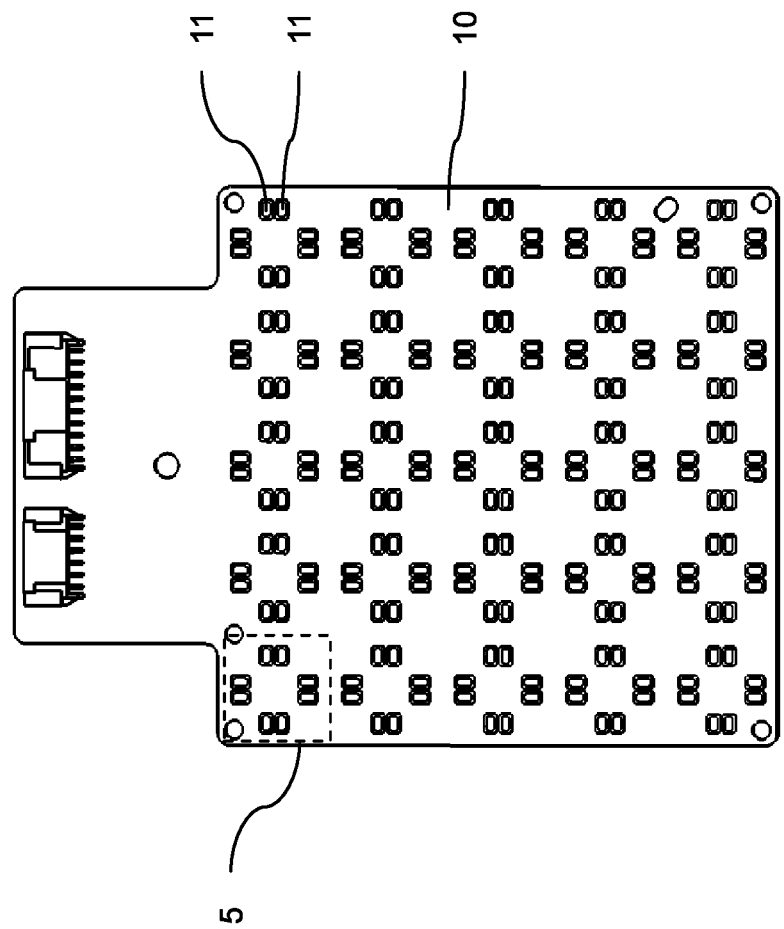
FIG. 4 shows a top view of a circuit board of the lighting device from FIG. 1.

Shown in FIG. 4 is a circuit board 10 of the lighting device 1 from FIG. 1 in a top view. As is evident, four pairs of light-emitting diodes 11 are arranged in each square arrangement 5. The light-emitting diodes 11 thus form a repeating O arrangement that corresponds to the arrangements 5.

Figure 5:
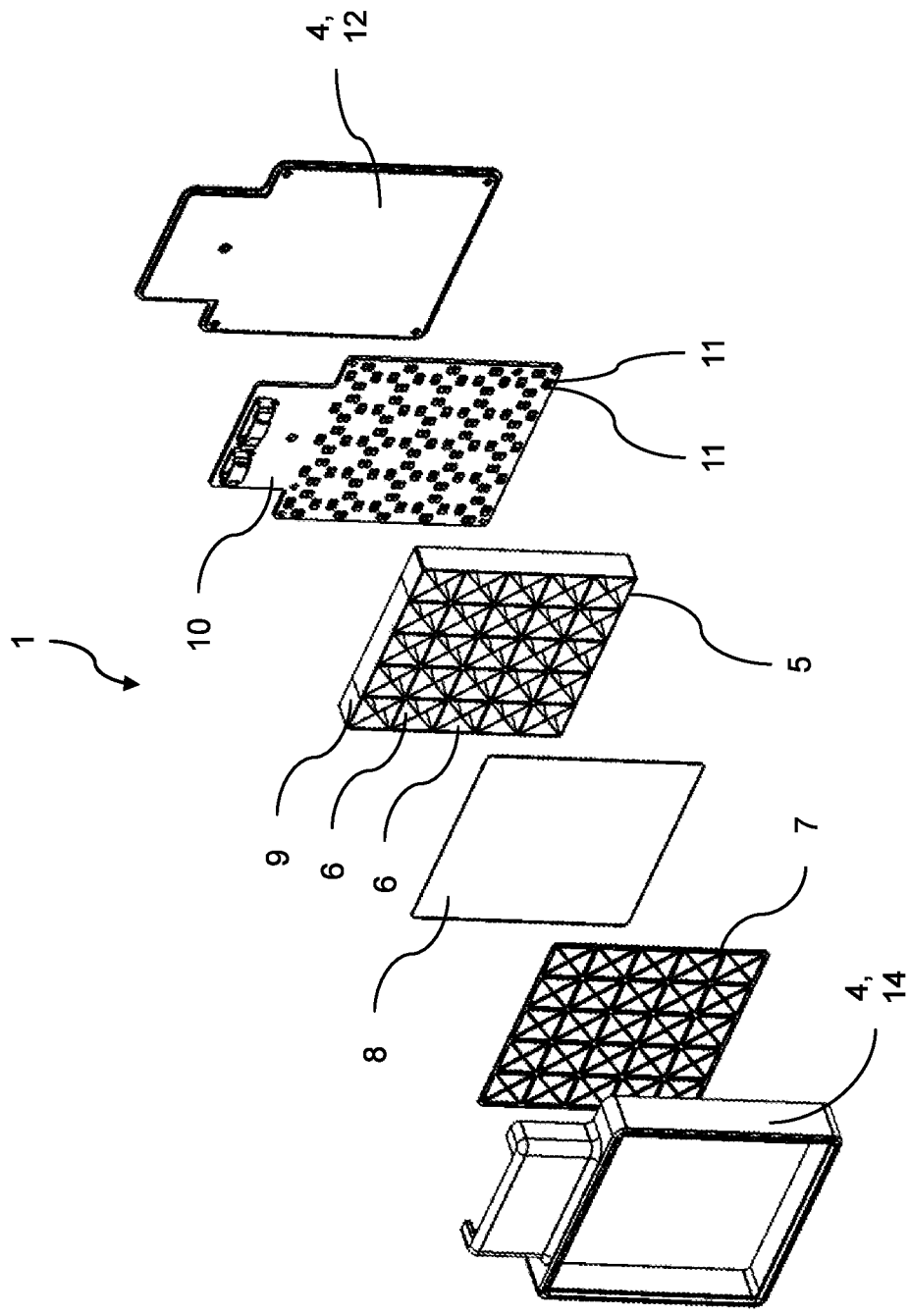
FIG. 5 shows an exploded view of the lighting device from FIG. 1.

FIG. 5 shows the lighting device 1 from FIG. 1 in an exploded view. In this view, the individual components of the lighting device 1 and their relative arrangement are especially easily visible. The housing 4 has a housing front part 13 and a housing back wall 12 to delimit and seal a housing interior. The circuit board 10 with the light-emitting diodes 11 can be arranged on, preferably secured to, the housing back wall 12.

The reflector element 9 has the square arrangements 5 that are arranged side by side in five rows and five columns by way of example, and that are each subdivided into four segments 6. The reflector element 9 in the present case is designed as a single piece with all arrangements 5 and segments 6. Alternatively, however, the segments 6 can also be produced individually, although this is more expensive.

The reflector element 9 can be arranged on the circuit board 10 in such a way that two light-emitting diodes 11 at a time arranged on the circuit board 10 project into each segment 6 of the reflector element 9, so that each of the segments 6 laterally or fully surrounds two light-emitting diodes 11.

Arranged on the reflector element 9 is an optical layer 8, made of plastic for example. The optical layer 8 preferably is designed as a diffuser film. A grid mask 7, designed as a single piece in this exemplary embodiment, can be arranged on the optical layer 8, which grid mask is designed for optical separation of the segments 6 from one another. All of the aforementioned components can be accommodated in the housing 4 between the housing front part 13 and the housing back wall 12.

Figure 6:
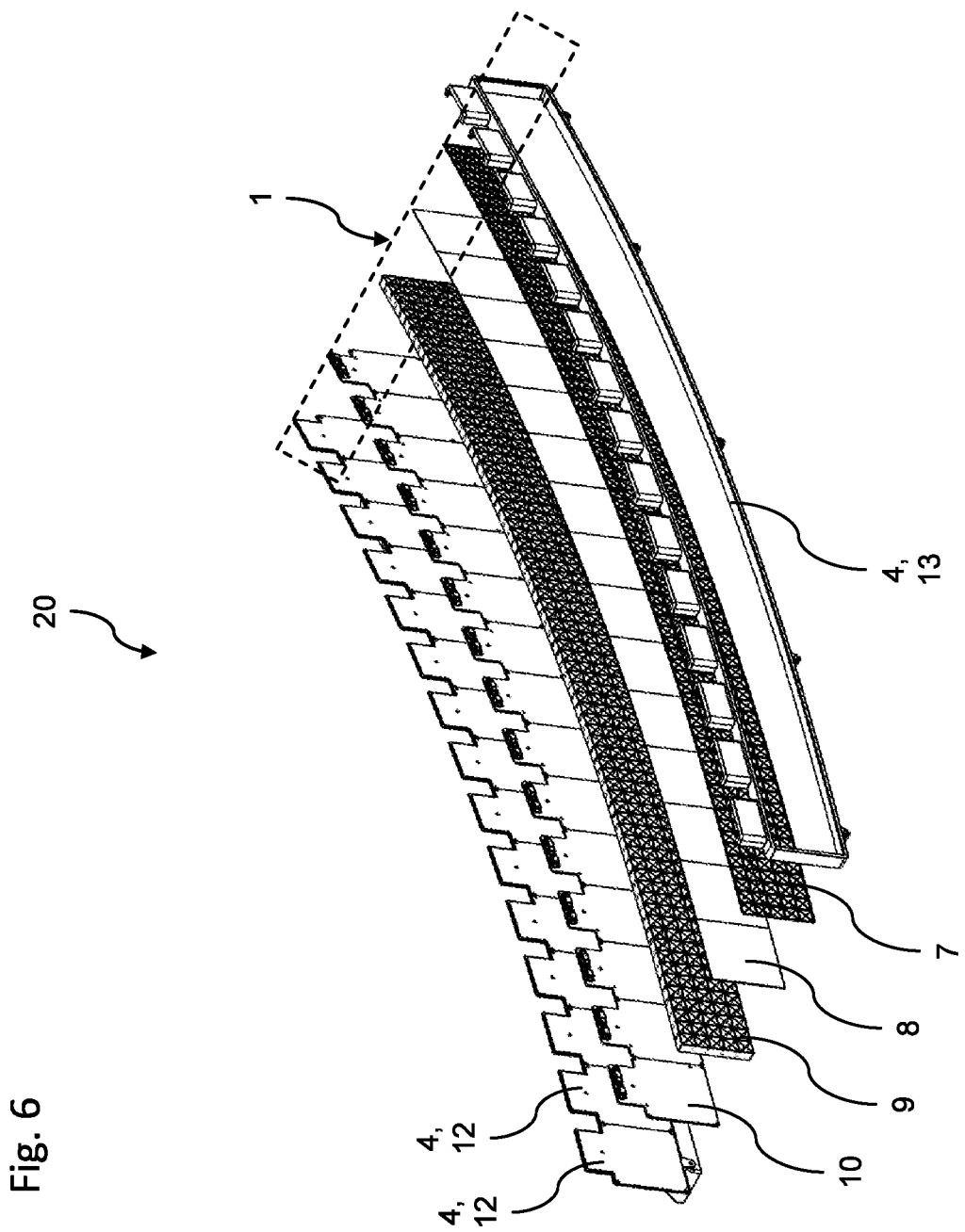
FIG. 6 shows an exploded view of a lighting system according to a preferred exemplary embodiment of the invention.
Figure 7:
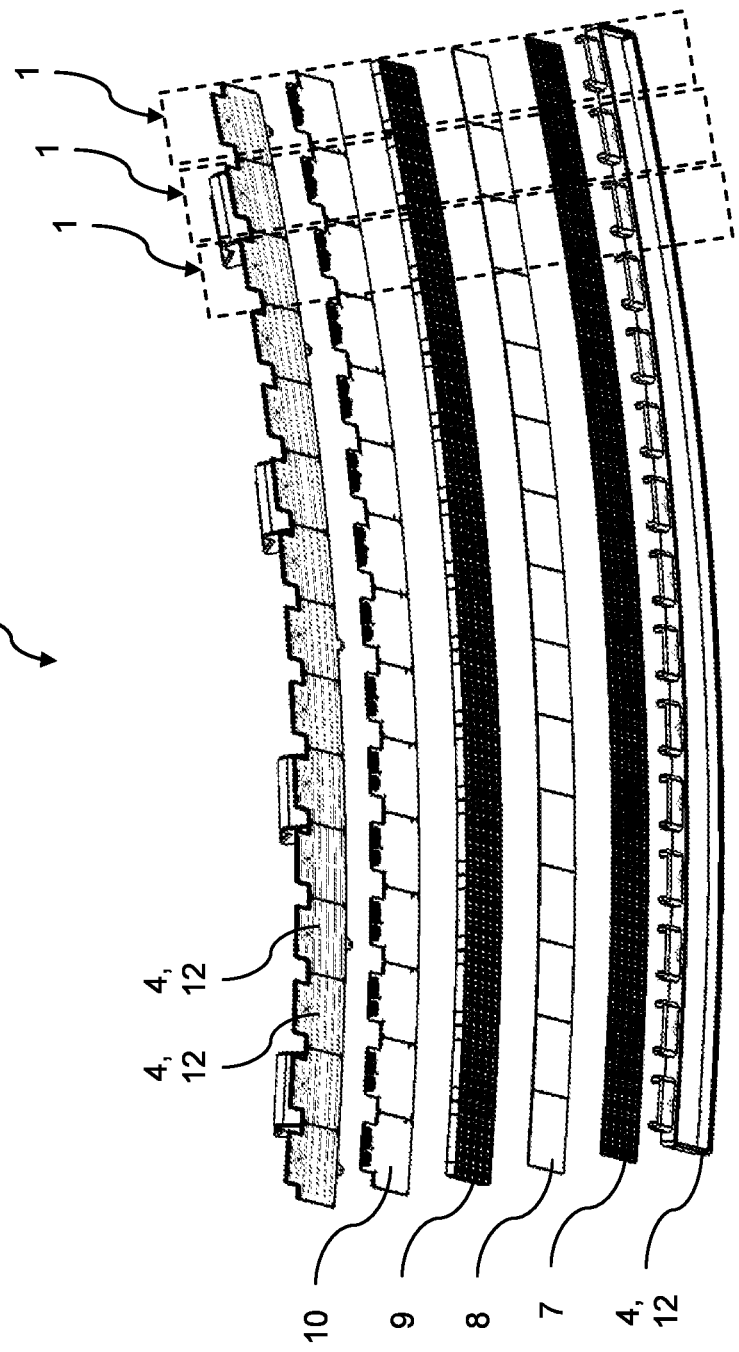
FIG. 7 shows another exploded view of the lighting system from FIG. 6.

FIGS. 6 and 7 each schematically show a perspective exploded view of a lighting system 20 with multiple lighting devices 1, in the present case fifteen purely by way of example. The lighting devices 1 can be driven by means of individual control units or a shared control unit. Furthermore, the adjacent lighting devices 1 have a slight angular offset relative to one another. In this way, a curvature of the lighting system 20 is achieved so that the lighting system 20 can be adapted virtually at will to predefined contours, such as, e.g., those of a motor vehicle 30 (see FIG. 15).

For optical reasons and for better installability, the housing front part 13 of the housing 4 is designed in the exemplary embodiment shown as a single piece to accommodate all circuit boards 10, reflector elements 9, optical layers 8, and grid masks 7. A back of the housing 4 can be closed by one housing back wall 12 per lighting device 1. Alternatively, the housing back walls 12 can also be combined into back wall groups designed as one part or one back wall group designed as one part that includes all housing back walls 12.

Figure 8:
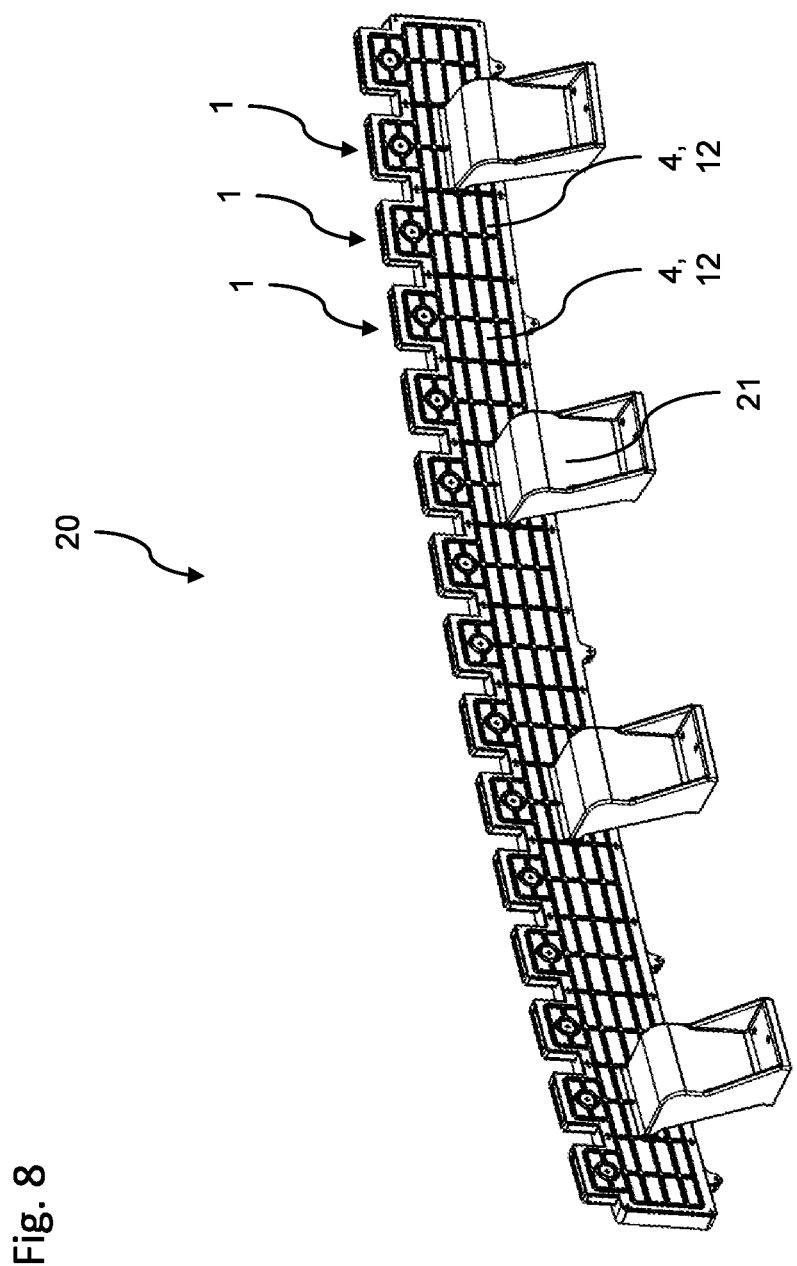
FIG. 8 shows a perspective view from the rear of the lighting system from FIG. 6.

In FIG. 8, the lighting system 20 according to the preferred embodiment is shown in an assembled state in a perspective view from the back. In this view, mounting flanges 21 for fastening the lighting system 20 to a motor vehicle 30 are easily visible.

Figure 9:
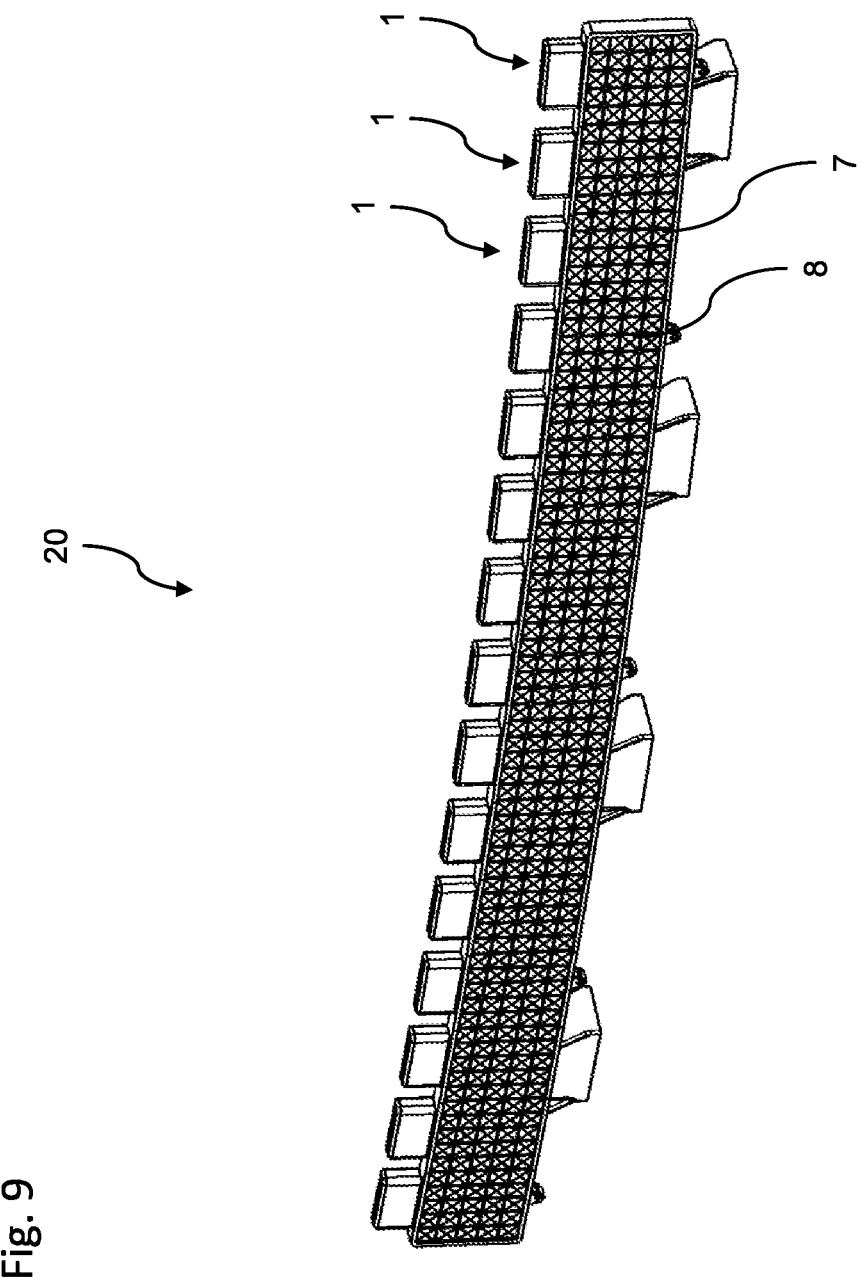
FIG. 9 shows a perspective view from the front of the lighting system from FIG. 6.
Figure 10:
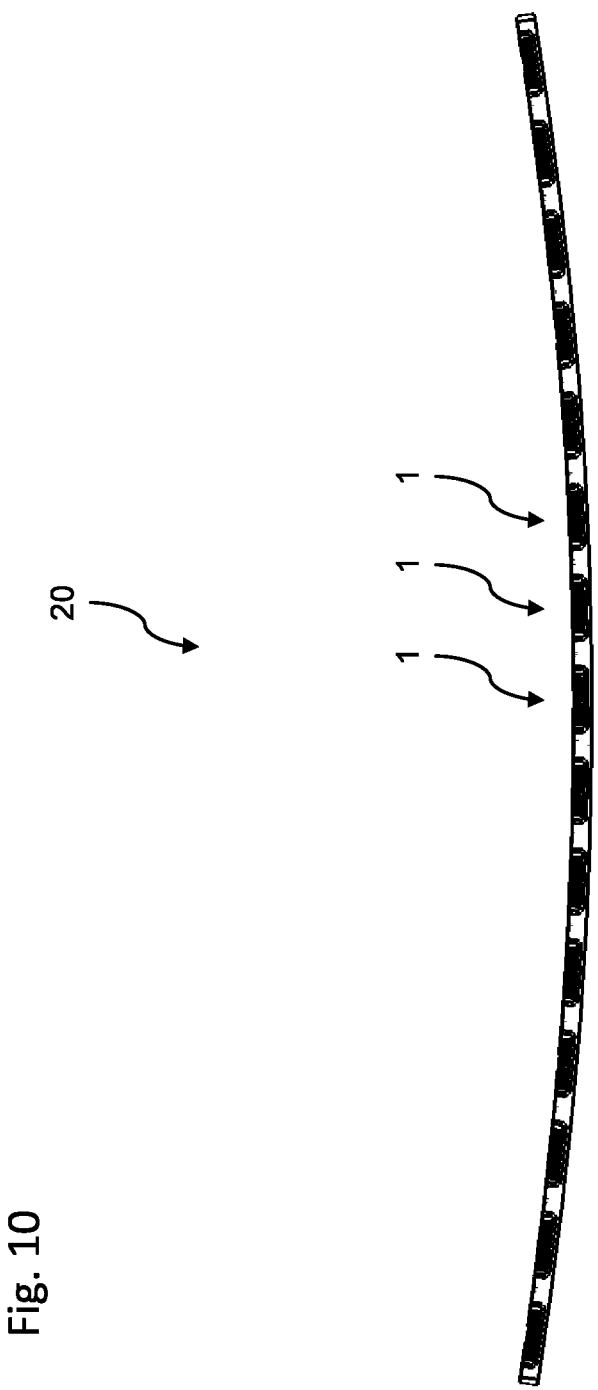
FIG. 10 shows a top view of the lighting system from FIG. 6.

FIG. 9 shows the lighting system 20 according to the preferred embodiment in an assembled state in a perspective view from the front. In this view, the optical layers 8 and the grid masks 7 arranged in front thereof are easily visible. The lighting system 20 has a curved strip optic. The curve of the lighting system 20 is especially easily visible in FIG. 10.

Figure 11:
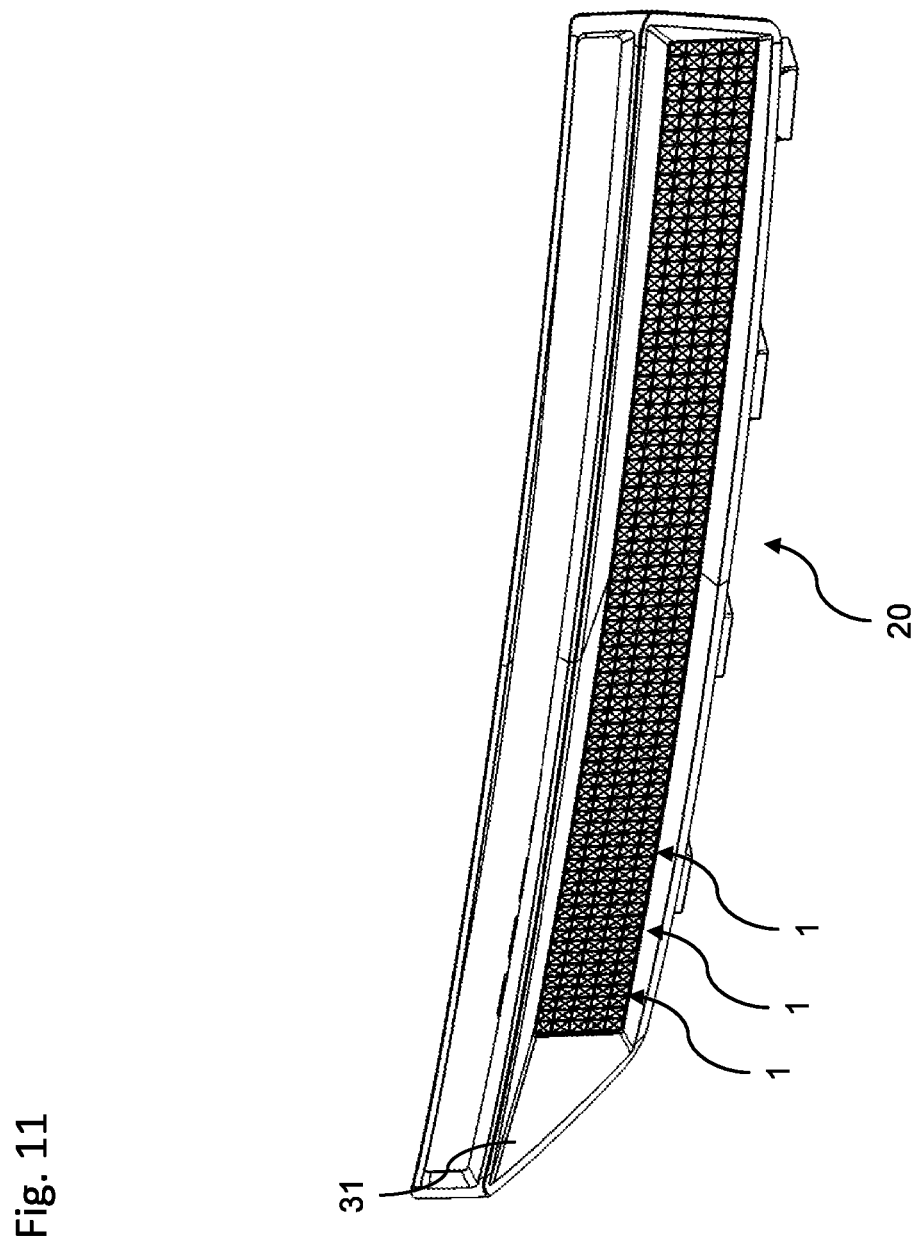
FIG. 11 shows a detail view of a lighting system according to another preferred embodiment of the invention.
Figure 12:
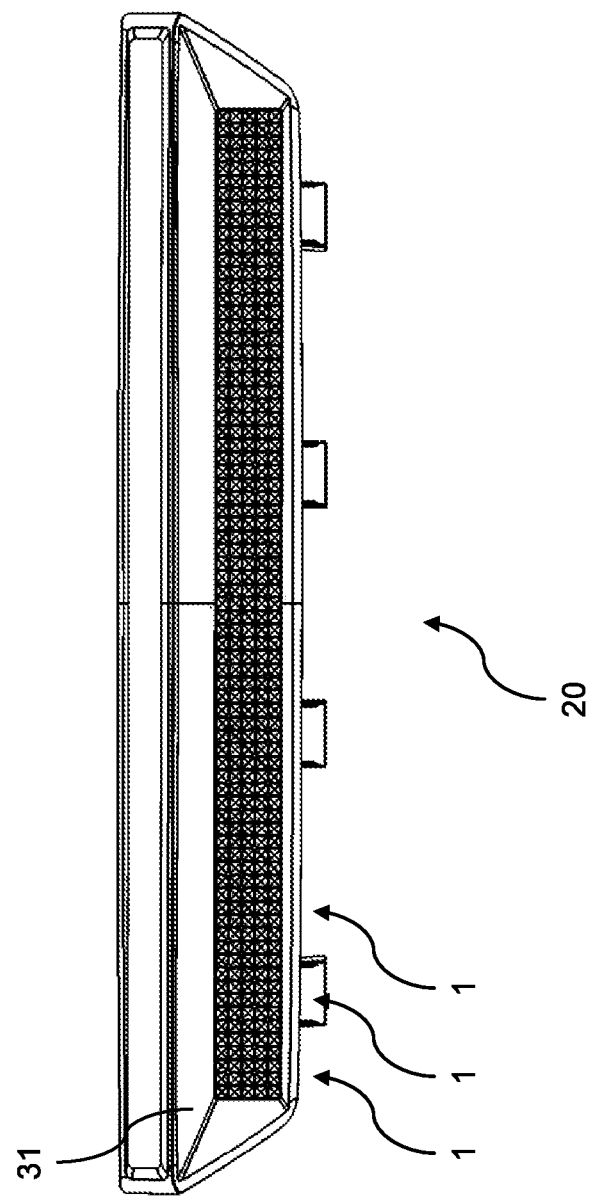
FIG. 12 shows an overall view of the lighting system from FIG. 11.

In FIGS. 11 and 12, a lighting system 20 according to another preferred embodiment of the invention is shown in a detail view and an overall view. The lighting system 20 is integrated into a body element 31 of a motor vehicle 30.

Figure 13:
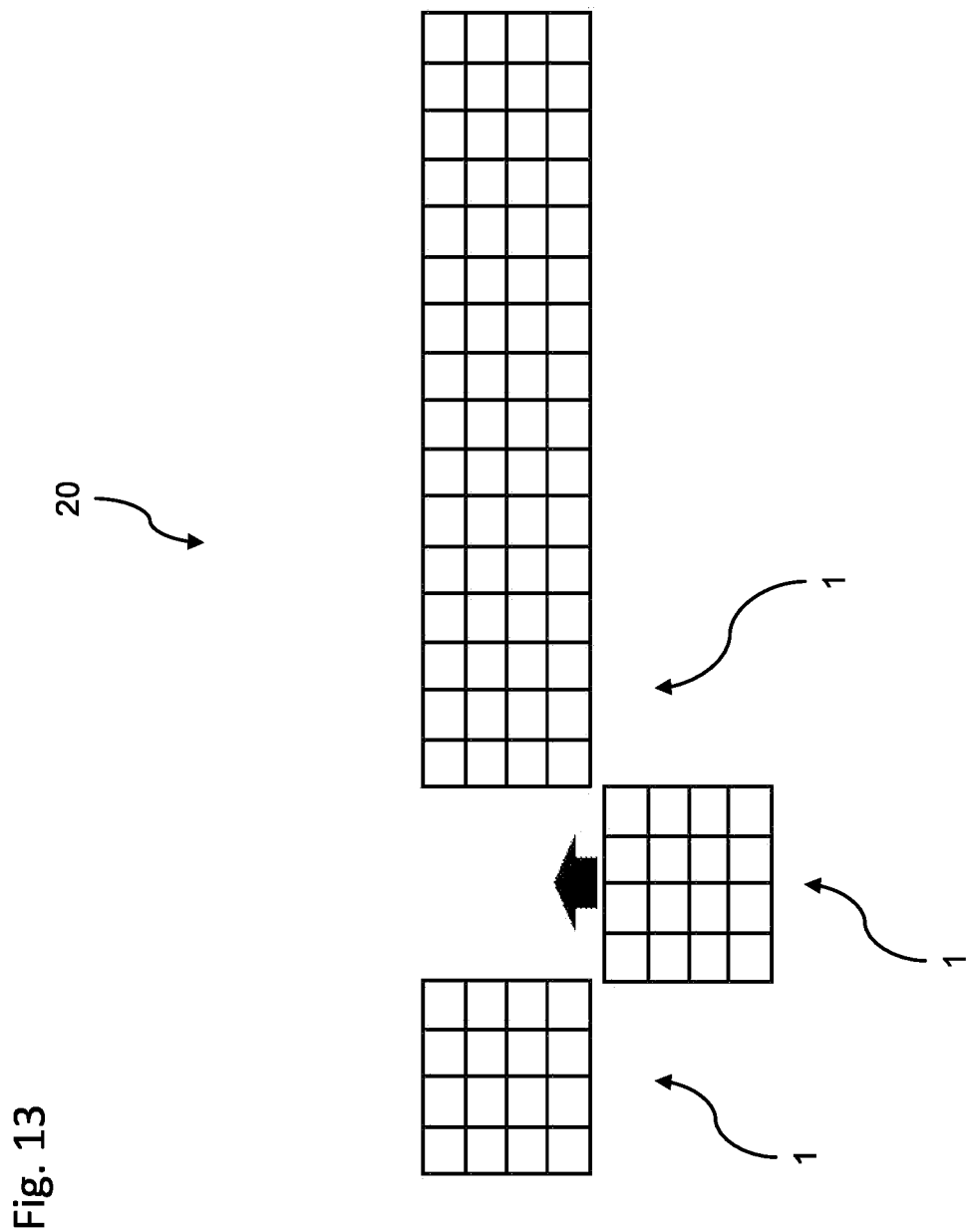
FIG. 13 shows a schematic view of a preferred first configuration of lighting devices of a lighting system according to the invention.
Figure 14:
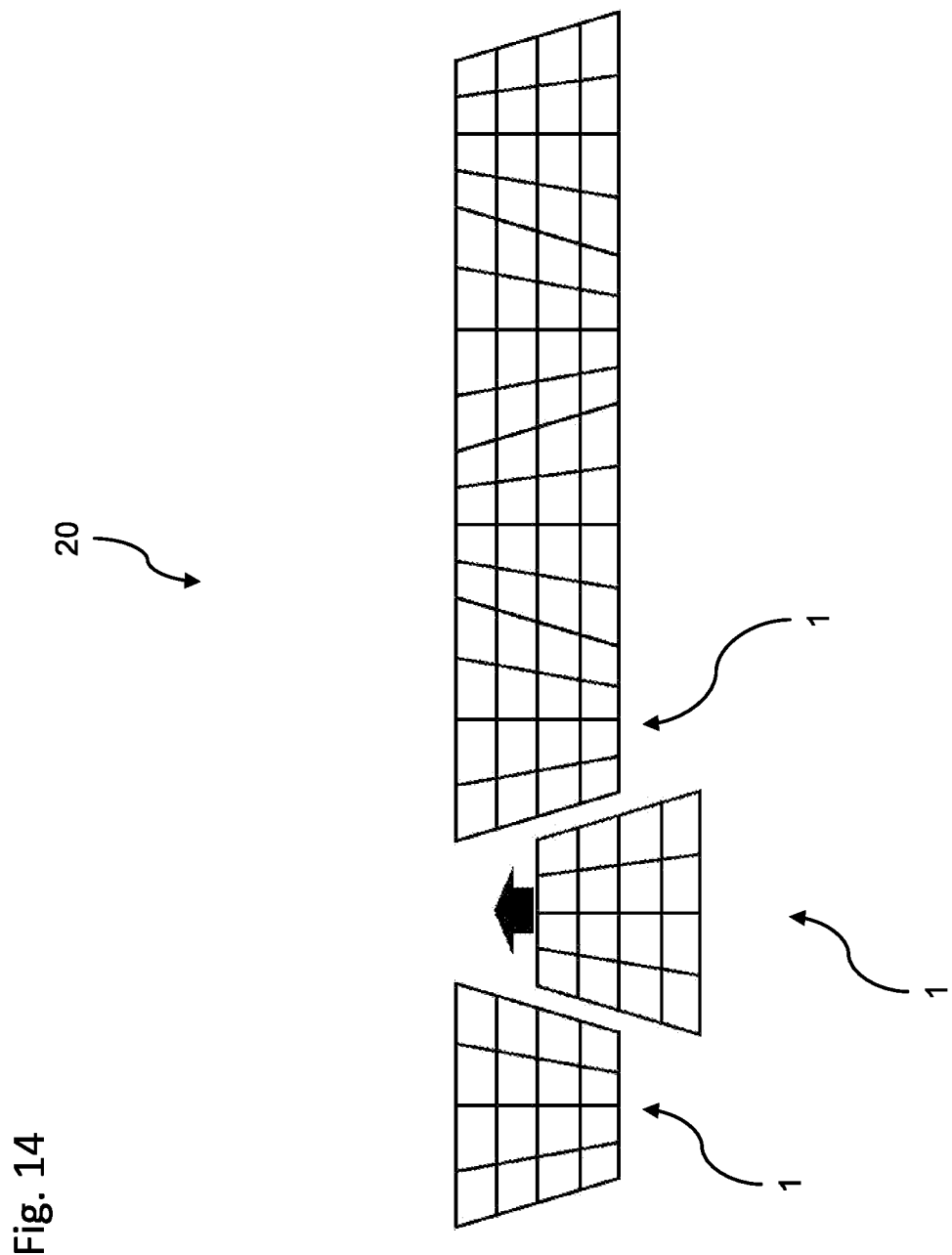
FIG. 14 shows a schematic view of a preferred second configuration of lighting devices of a lighting system according to the invention.

A first configuration of lighting devices 1 of a lighting system 20 according to the invention is shown schematically in FIG. 13, and a second arrangement in FIG. 14. According to the first configuration, the lighting devices 1 have a rectangular, preferably square, emitting area and thus can be joined to form, for example, a strip-like lighting system 20. According to the second configuration, the lighting devices 1 have a trapezoidal emitting area and thus can likewise be joined, for example alternately rotated by 180° in each case, to form a strip-like lighting system 20. According to the invention, lighting systems 20 with other shapes can also be formed with the lighting devices 1.

Figure 15:
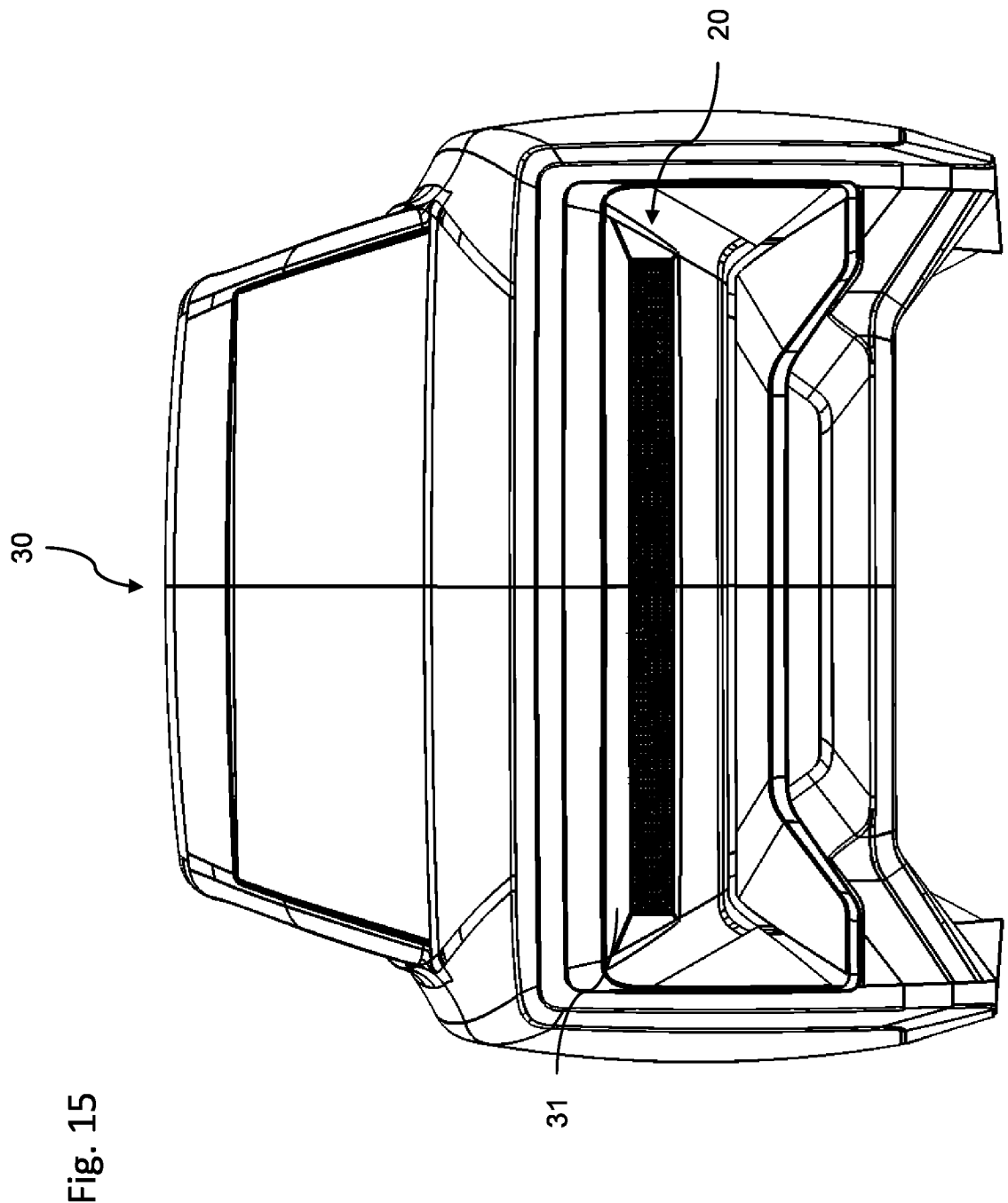
FIG. 15 shows a rear view of a motor vehicle according to an exemplary embodiment of the invention.

FIG. 15 shows the rear view of a motor vehicle 30 according to a preferred exemplary embodiment of the invention. A preferred embodiment of a lighting system 20 according to the invention is arranged on the back and integrated into a body element 31 of the motor vehicle 30. Alternatively or in addition, a lighting system 20 according to the invention can also be arranged on a front of the motor vehicle 30. The depicted lighting system 20 can be designed according to the invention to represent, for example, tail lights, turn signal lights, brake lights, rear fog lights, text, images, or the like. A possible lighting system 20 arranged on the front side can be designed according to the invention to represent, for example, low-beam lamps, high-beam lamps, turn signal lights, front fog lights, text, images, or the like.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a motor vehicle, the lighting device comprising:
    a circuit board with a plurality of light-emitting diodes for emitting light arranged thereon;
    a transparent optical layer;
    a reflector element arranged between the circuit board and the optical layer, the reflector element having multiple segments into which the reflector element is subdivided, the segments being associated with the light-emitting diodes so that light emitted by the light-emitting diodes is adapted to be reflected by the segments of the reflector element and passes through the optical layer; and
    a grid mask that delimits the segments of the reflector element from one another,
    wherein at least two of the light-emitting diodes are arranged in each of the segments,
    wherein the reflector element is a frame with reflective segment walls that divide the frame into each of the segments to reflect the light emitted by the light-emitting diodes, and
    wherein the grid mask has opaque grid elements forming a grid structure that corresponds to the arrangement of the segment walls of the reflector element so that, in a fully assembled state in which the grid mask is positioned downstream of the reflector element in a light transmission direction with the optical layer being positioned between the reflector element and the grid mask, the grid structure of the grid mask aligns with and covers the segment walls of the reflector element.

2. The lighting device according to claim 1, wherein the at least two of the light-emitting diodes are arranged in at least some of the segments or in all of the segments of the reflector element.

3. The lighting device according to claim 1, wherein the at least two of the light-emitting diodes within each of the segments have different colors from one another.

4. The lighting device according to claim 1, wherein the optical layer has a diffuser film or a diffuser plate.

5. The lighting device according to claim 1, wherein the optical layer has multiple stacked diffuser films or diffuser plates.

6. The lighting device according to claim 1, wherein the optical layer has a wall thickness between 0.2 mm and 1.2 mm.

7. The lighting device according to claim 1, wherein the lighting device further comprises a housing in which the circuit board, the reflector element, and the optical layer are accommodated.

8. The lighting device according to claim 1, wherein a spacing between the light-emitting diodes and the optical layer is less than 15 mm.

9. The lighting device according to claim 1, wherein the segments have a triangular, rectangular, pentagonal, hexagonal shape, or other polygonal shape.

10. A lighting system for a motor vehicle comprising:
    one or more lighting devices according to claim 1; and
    a control unit for controlling a light emission of the one or more lighting devices.

11. The lighting system according to claim 10, wherein the at least two of the light-emitting diodes within each of the segments have different emission colors from one another, and wherein the lighting system is designed to provide multiple different light signals.

12. A motor vehicle comprising a lighting device according to claim 1.

13. The motor vehicle according to claim 12, wherein the lighting device is arranged along a contour of curvature of the motor vehicle, wherein individual lighting devices have different mounting angles, each of which is matched to a position of the relevant lighting device along the contour of curvature.

14. The lighting device according to claim 1, wherein each of the segments is triangular shaped.

15. The lighting device according to claim 14, wherein each of the triangular shaped segments has the at least two of the light-emitting diodes arranged therein, and wherein the at least two of the light-emitting diodes arranged within each respective triangular shaped segment have different colors from one another or emit different light waves from one another.

* * * * *